United States Patent
Ward et al.

(10) Patent No.: US 7,894,477 B2
(45) Date of Patent: Feb. 22, 2011

(54) FRAMING MOBILE COMMUNICATION SIGNALS FOR ANALYSIS

(75) Inventors: Robert G. Ward, Colorado Springs, CO (US); Roger Ruhnow, Monument, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 661 days.

(21) Appl. No.: 11/359,727

(22) Filed: Feb. 22, 2006

(65) Prior Publication Data
US 2007/0195708 A1    Aug. 23, 2007

(51) Int. Cl.
*H04J 3/16* (2006.01)
(52) U.S. Cl. .................................. 370/468; 709/236
(58) Field of Classification Search ................ 370/536, 370/498, 464, 465–469; 709/236, 230
See application file for complete search history.

(56) References Cited

U.S. PATENT DOCUMENTS

| | | | | |
|---|---|---|---|---|
| 5,633,873 A | * | 5/1997 | Kay et al. | 370/336 |
| 6,108,625 A | * | 8/2000 | Kim | 704/229 |
| 6,167,085 A | * | 12/2000 | Saunders et al. | 375/240.03 |
| 7,428,269 B2 | * | 9/2008 | Sampath et al. | 375/267 |
| 2003/0235222 A1 | * | 12/2003 | Bridges et al. | 370/542 |
| 2004/0001079 A1 | * | 1/2004 | Zhao et al. | 345/719 |
| 2004/0100920 A1 | * | 5/2004 | Ball et al. | 370/318 |
| 2004/0240470 A1 | * | 12/2004 | Medved et al. | 370/469 |
| 2005/0018754 A1 | * | 1/2005 | Song | 375/142 |
| 2005/0047350 A1 | * | 3/2005 | Kantor et al. | 370/254 |
| 2005/0201289 A1 | * | 9/2005 | Smolinske et al. | 370/236.1 |
| 2005/0265430 A1 | * | 12/2005 | Ozluturk et al. | 375/145 |

* cited by examiner

*Primary Examiner*—Aung S Moe
*Assistant Examiner*—Kerri M Rose
(74) *Attorney, Agent, or Firm*—Matthew A. Pequignot; Pequignot + Myers LLC

(57) ABSTRACT

Systems and methods for framing mobile communication signals for analysis are disclosed herein. In one example, a framing module of a mobile communication system comprises a channel extractor, a framing path, and a feedback path. The channel extractor enables a user to assign voice and data channels in a number of timeslots. The framing path is configured to monitor parameters of the channels and assemble pieces of channel information to create a frame. The feedback path is configured to analyze a signaling channel from the frame and to analyze one or more parameters of the signaling channel to determine a list of appropriate framing protocols. The framing path is further configured to determine whether a framing protocol for a frame is included in the framing protocol list.

12 Claims, 3 Drawing Sheets

FRAMING MOBILE COMMUNICATION SIGNALS FOR ANALYSIS

TECHNICAL FIELD

The present disclosure generally relates to mobile communication systems. More particularly, the present disclosure relates to systems and methods for extracting mobile communication information from a mobile communication system and framing this information in preparation for analysis.

BACKGROUND

Mobile communication systems, such as cellular telephone systems and the like, continue to improve and expand to meet user's demands. Mobile communication systems were originally created for transmitting only voice or speech signals, but these systems have been improved over the years to be capable of communicating not only voice information but data information as well. Data in this respect refers particularly to the information transferred during certain services such as text messaging, Internet access, etc.

While mobile service providers have made improvements in mobile communication systems to increase data transfer rates and keep costs low, a need for increased monitoring of these systems has also increased. Monitoring mobile communication systems provides test results that may be used for analyzing the performance or integrity of the mobile system. Furthermore, these test results may be used for troubleshooting when problems arise. However, extracting and framing these communication signals for the purpose of analysis or troubleshooting is not a simple task. In the context of this disclosure, "framing" refers to detecting a group of bits within a frame, generally known as a framing pattern, to create a frame that contains address information, control bits, valid voice and/or data information, frame checking bits, etc.

FIG. 1 is a block diagram illustrating a conventional base station system (BSS) 10. The BSS 10 may be part of a mobile communication system or the like. The BSS 10 includes a base station controller (BSC) 12 and a number of base transceiver stations (BTSs) 14. Each of the BTSs 14 includes an antenna 16 or a group or array of antennas configured to transmit signals to and receive signals from many mobile devices, e.g. cellular telephones (not shown). The BTSs 14 communicate with the BSC 12 along communication paths, or transmission lines 18. The transmission lines 18 may be made up of optical waveguides, such as fiber optic cable, and/or electrical lines and may include other elements for transmitting or transferring signals.

The BSC 12 typically includes hardware and software for processing and controlling voice and data traffic in the BSS 10. In earlier systems, the BSC 12 controlled only voice traffic, which typically is transferred at a transfer rate of 16 kilobits per second (16 kbps). When mobile communication systems were improved to be able to handle data transmission, the systems could originally transfer data at the same 16 kbps rate. However, since this was considered to be too slow for many customers, further improvements to these systems were made to increase data transfer rates, allowing rates of up to, but not limited to, five times the 16 kbps rate on multiple channels. Allocating up to five channels for data transfer, the BSS 10 can transfer data up to 80 kbps and greater if needed.

Other improvements to mobile communication systems include the compression of voice information when signal quality is high. For example, if a voice call can be characterized as a high quality call with low noise or distortion, the 16 kbps bandwidth allocated to this call can be split into two 8 kbps channels, allowing two such calls to occupy one channel. As a result, the technique of splitting channels can be performed in order to reduce overall costs.

Mobile communication systems that offer the above-mentioned services to mobile customers further provide monitoring devices that routinely monitor the mobile communication systems to ensure that the quality of the available services is maintained. Monitoring can also be done to troubleshoot the systems when problems or errors are detected. Normally, a technician would be required to manually check the signaling channels of the system. The "signaling channel" in the present disclosure refers to a portion of code transmitted in the mobile communication system along with related channels. The signaling channel includes information about how the other related channels are configured in the system. However, as mentioned above, multiple channels can be bundled to up to five times the normal 16 kbps channels for data transfers and voice channels can be split into 8 kbps channels. As a result, the analysis of mobile communication systems can encounter many problems. Thus, a need exists in the industry to address the deficiencies and inadequacies to allow a monitoring system that can properly frame signals for analysis.

SUMMARY

Systems and methods are described in the present application for framing mobile communication signals for the purpose of analysis. In one embodiment, among others, a distributed network analyzer analyzes voice and data signals in a mobile communication system. The distributed network analyzer in this embodiment comprises a demultiplexer module, a framing module, and an analysis device. The demultiplexer module is configured to receive mobile communication signals from one or more sources. The demultiplexer module is further configured to demultiplex the mobile communication signals to a T1/E1 level. The demultiplexer module may further be configured to demultiplex the mobile communication signals at the T1/E1 level to 64 kbps timeslots. The framing module is configured to assemble frames from the demultiplexed mobile communication signals, and the analysis device is configured to analyze the assembled frames.

In another example, a framing module of a mobile communication system is described according to the present disclosure. The framing module comprises a channel extractor, a framing path, and a protocol feedback path. The channel extractor is configured to enable a user to assign voice and data channels in a number of available timeslots. The framing path is configured to monitor parameters of the timeslots and assemble pieces of channel information to create a frame. The protocol feedback path is configured to analyze a signaling channel from the channels and to analyze one or more frames of the signaling channels to determine a list of appropriate framing protocols. The framing path may comprise a framer, for example, and is further capable of determining whether a framing protocol for a frame is included in the list.

In operation, the framing devices disclosed herein may include a process for framing information in a mobile communication system. One framing method may include demultiplexing mobile communication signals from optical or electrical transmission lines. Demultiplexing the signals, for example, may include demultiplexing signals in a synchronous transfer mode (STM-1) into a number of constituent T1/E1 signals. The method may also further demultiplex the signals into timeslots and frame the timeslots into a frame according to available framing protocol information.

Other systems, methods, features, and advantages of the present disclosure will be apparent to one having skill in the art upon examination of the following drawings and detailed description. It is intended that all such additional systems, methods, features, and advantages be included within this description and protected by the accompanying claims.

BRIEF DESCRIPTION OF THE DRAWINGS

Many aspects of the embodiments disclosed herein can be better understood with reference to the following drawings. Like reference numerals designate corresponding parts throughout the several views.

DETAILED DESCRIPTION

Figure 1:
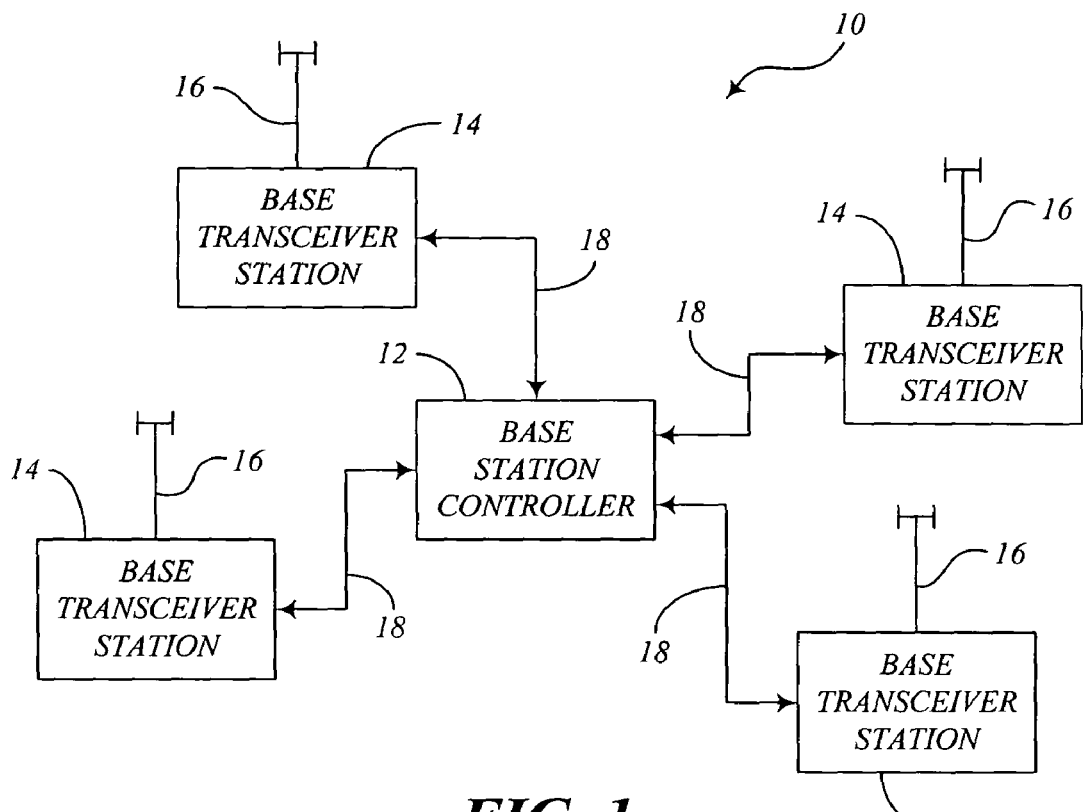
FIG. 1 is a block diagram of a conventional base station system.
Figure 2:
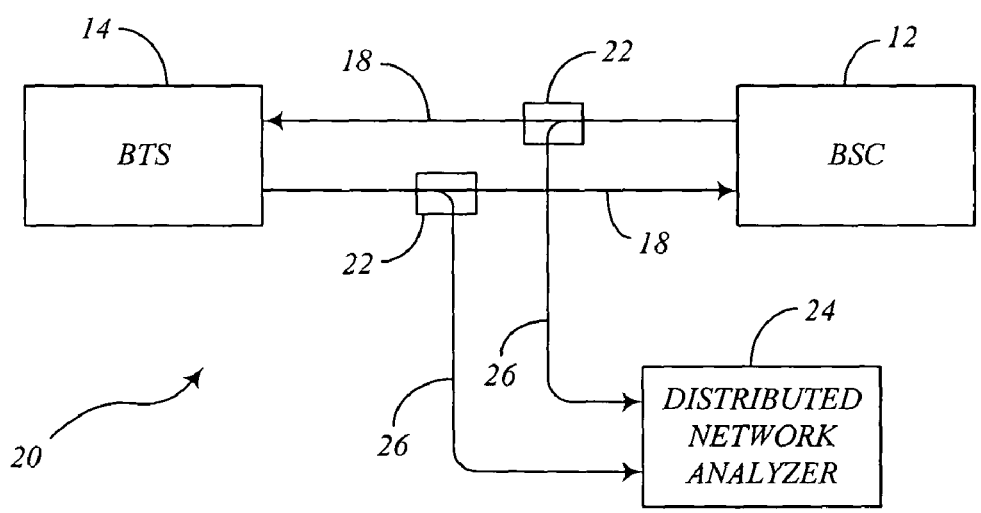
FIG. 2 is a block diagram of a portion of a base station system and an embodiment of an analysis system for monitoring mobile communication signals according to the teachings of the present disclosure.

FIG. 2 is a block diagram of an embodiment of a system 20 for testing mobile communication signals. This embodiment also includes a portion of a base station system from which the signals are extracted for analysis. The base station system includes at least one base transceiver station (BTS) 14 and a base station controller (BSC) 12. It should be understood that the base station system may include any number of BTSs 14. The BTS 14 communicates with the BSC 12 over transmission lines 18. In this embodiment, the transmission lines 18 may be fiber optic lines meeting the synchronous optical network (SONET) standard, such as synchronous digital hierarchy (SDH) or plesiochronous digital hierarchy (PDH). In this case, information may be transmitted according to a synchronous transfer mode (STM) format of 155.52 megabits per second (155.52 Mbps) for a STM-1 transfer. Furthermore, the system may include multiplexed transmission lines, e.g. STM-4, for transmitting at a rate of a multiple of STM-1. The transmission lines 18 may include optical waveguides, such as optical fibers or the like.

Alternatively, the transmission lines 18 interconnecting BTS 14 and BSC 12 may include electrical lines, such as electrical wires or conductors. Also, the transmission lines 18 may include combinations of both optical and electrical components for transmitting signals. The electrical lines, for example, may be capable of transmitting under the T1 or E1 format. The T1 format may include lines that support a data transfer rate of 1.544 Mbps and the E1 format may include lines that support a data transfer rate of 2.048 Mbps. In the T1 format, 24 individual timeslots are utilized, where each timeslot includes 64 kbps channels for carrying voice or data information. In the E1 format, 31 individual timeslots are utilized, where each timeslot has a bandwidth of 64 kbps.

Of the available timeslots of T1 or E1, at least one timeslot is usually designated as a "signaling channel". The signaling channel defines how the remaining 64 kbps timeslots are to be allocated. For example, the signaling channel can define how each of the remaining timeslots is divided, e.g. divided into 16 kbps voice channels, 8 kbps voice channels, 16 kbps data channels, data within multiple 16 kbps channels, or combinations thereof. It also can define whether the divided timeslots are used for voice or data signals. The signaling channel sets up the channels in a sub-slot bandwidth of 8 kbps, 16 kbps, or multiple 16 kbps. The system configures the signaling channel in a dynamic fashion such that more channels may be allocated to data if needed or a voice channel can be split if the quality of the call can handle a smaller bandwidth.

The 64 kbps channels of T1 and E1 are configured in a high-level data link control (HDLC) portion of the data link layer (layer 2) of the open system interface (OSI) model. The 64 kbps signaling channel in HDLC also includes a delimiting flag. The delimiting flag separates frames from each other and fills unused space between the HDLC frames with fill bytes. The delimiting flag is typical one byte in length and is written 0111_1110. When valid data within the information portion of the HDLC frame comprises at least five "1" bits in a row, a "0" bit is added after the fifth valid "1". The system automatically performs this bit adding in order to distinguish the valid data from the delimiting flag.

The testing system 20 includes optical couplers 22 or splitters for optically extracting the communication signals transmitted between the BTS 14 and the BSC 12 in the SONET/SDH format. When the transmission lines are electrical T1/E1 lines, the couplers 22 may be replaced with electrical sensors for detecting the signals on the lines. The extracted signals are transmitted to a distributed network analyzer 24 along optical and/or electrical transmission lines 26. The distributed network analyzer 24 analyzes the signals according to certain specifications, which may be defined, for example, by the testing system 20 itself or by a person who can allocate the particular channels manually. Signals transferred along transmission lines 18 include information transmitted in the 8 kbps, 16 kbps, and multiple 16 kbps formats for voice and/or data information. The signals are extracted by the couplers 22 and transmitted to the distributed network analyzer 24 for analysis. The distributed network analyzer 24 may be configured in software, for example, for appropriately framing the signals in preparation for analysis and may further be configured to analyze the framed signals.

Alternatively, the distributed network analyzer 24 may include hardware, or a combination of hardware and software, for analyzing the mobile signals. The distributed network analyzer 24 monitors the dynamic signaling channel, and from the signaling channel, the distributed network analyzer 24 is able to monitor the mobile communication signals of the mobile system. In this way, the distributed network analyzer 24 is able to determine whether or not the mobile communication system operates in an acceptable manner or if modifications or repairs might be needed.

As mentioned above, the distributed network analyzer 24 of the present disclosure can be implemented in hardware, software, firmware, or a combination thereof. In one embodiment, the distributed network analyzer 24 is implemented in software or firmware that is stored in a memory and that is executed by a suitable instruction execution system. In alternative embodiments, the distributed network analyzer 24 is implemented in hardware having any suitable circuitry or combination of discrete logic circuitry having logic gates for implementing logic functions upon signals. The distributed network analyzer 24 may also include an application specific integrated circuit (ASIC) having appropriate combinational logic gates, a programmable gate array (PGA), a field programmable gate array (FPGA), etc. Preferably, the distributed network analyzer 24 is configured using an FPGA.

Figure 3:
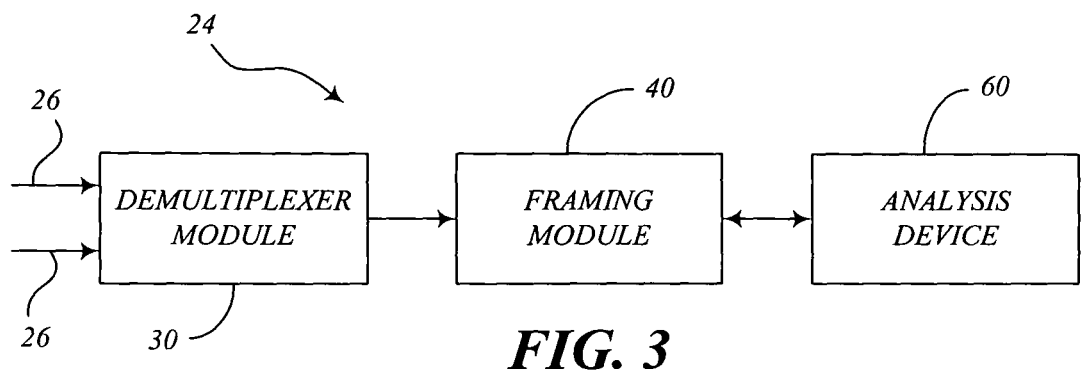
FIG. 3 is a block diagram of an embodiment of the distributed network analyzer shown in FIG. 2.

FIG. 3 is a block diagram of an embodiment of the distributed network analyzer 24 shown in FIG. 2. In general, this embodiment includes a demultiplexer module 30, a framing module 40, and an analysis device 60. The demultiplexer module 30 receives communication signals along transmission lines 26 from various sources. The demultiplexer module 30 may include, for example, a four-port STM-1 interface and an eight-port T1/E1 interface. The demultiplexer module 30 is capable of demultiplexing the STM-1 into T1s or E1s to process the signals at the same level as the T1s and E1s. In this respect, the STM-1 can be multiplexed to carry up to 63 E1s or 84 T1s. Therefore, the four-port STM-1 interface is capable of providing 252 E1s or 336 T1s.

Concerning the eight ports of the T1/E1 interface, four pairs of ports can be used to receive signals from four different BTSs, where each BTS communicates along two T1s or E1s. The distributed network analyzer 24 of FIG. 3 may be further expanded to handle a greater number of BTSs if desired. In this respect, signals from T1s, E1s, or STM-1s are supplied to the demultiplexer module 30 and demultiplexed to the T1 or E1 format. Also, the demultiplexer module 30 may be further configured to demultiplex the T1 or E1 signals into separate 64 kbps timeslots.

The framing module 40 is capable of monitoring the signaling channels on one or more of the individual 64 kbps channels. By monitoring the signaling channel(s), the framing module 40 is able to set up the remaining channels for monitoring multiple calls contained in the remaining channels. The framing module 40 can be further configured to handle multiple signaling channels at one time. The framing module 40 prepares the signals for analysis by framing the signals on the respective channels and storing the framed signals in an internal buffer. The analysis device 60 is configured to test the framed signals by accessing the frames held in the buffer. The analysis device 60 monitors the frames that are assembled in the framing module 40 to determine the integrity of the mobile communication system.

The framing module 40 may include a framing program or algorithm for framing the signals. The framing program of the framing module 40 may comprise a listing of executable instructions for implementing logical functions. The framing program can be embodied in any computer-readable medium for use by an instruction execution system, apparatus, or device, such as a computer-based system, processor-controlled system, or other suitable system that can execute instructions. In the context of this document, a "computer-readable medium" can be any medium that can contain, store, communicate, propagate, or transport the program for use by the instruction execution system, apparatus, or device. The computer-readable medium can be, for example, an electronic, magnetic, optical, electromagnetic, infrared, or semiconductor system, apparatus, device, or propagation medium. In addition, the scope of the present disclosure includes the functionality of the herein-disclosed embodiments configured with logic in hardware and/or software mediums.

Figure 4:
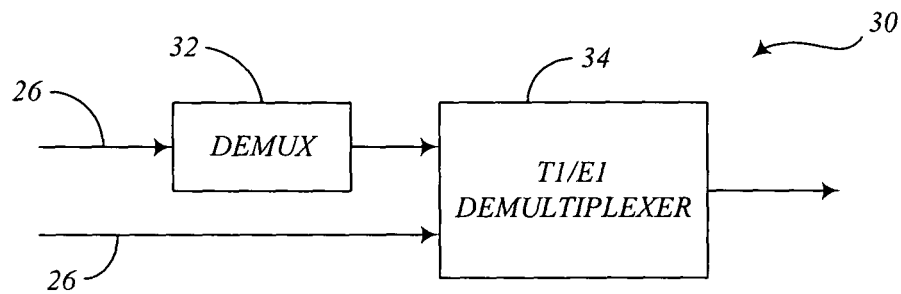
FIG. 4 is a block diagram of an embodiment of the demultiplexer module shown in FIG. 3.

FIG. 4 is a block diagram of an embodiment of the demultiplexer module 30 shown in FIG. 3. In this general embodiment, the demultiplexer module 30 includes an STM-1 demultiplexer 32 and a T1/E1 demultiplexer 34. The demultiplexer 32 demultiplexes the STM-1 signals that are received by the demultiplexer module 30 to separate the STM-1 into T1 or E1 channels. The demultiplexer module 30 includes two interfaces for receiving optical or electrical signals. In this embodiment, the interfaces include a four-port STM-1 interface and an eight-port T1/E1. However, the demultiplexer module 30 may be configured with additional ports to handle more channels if desired. The signals may be received from any suitable source or can be previously stored signals extracted at an earlier time. These separated channels, plus other T1 and E1 channels received at the lower input 26, are sent to the T1/E1 demultiplexer 34.

The T1/E1 demultiplexer 34 receives the signals in the T1/E1 channels directly from the T1 or E1 transmission lines 26 and/or from the demultiplexed signals broken down to their constituent T1/E1 channels by the demultiplexer 32. The T1/E1 demultiplexer 34 divides the T1s or E1s into their corresponding 64 kbps timeslots. As explained in more detail below, each 64 kbps timeslot of the T1 s or E1s is further divided into four 16 kbps channels by the framing module 40, where each 16 kbps channel can be further subdivided into two 8 kbps channels if needed.

Figure 5:
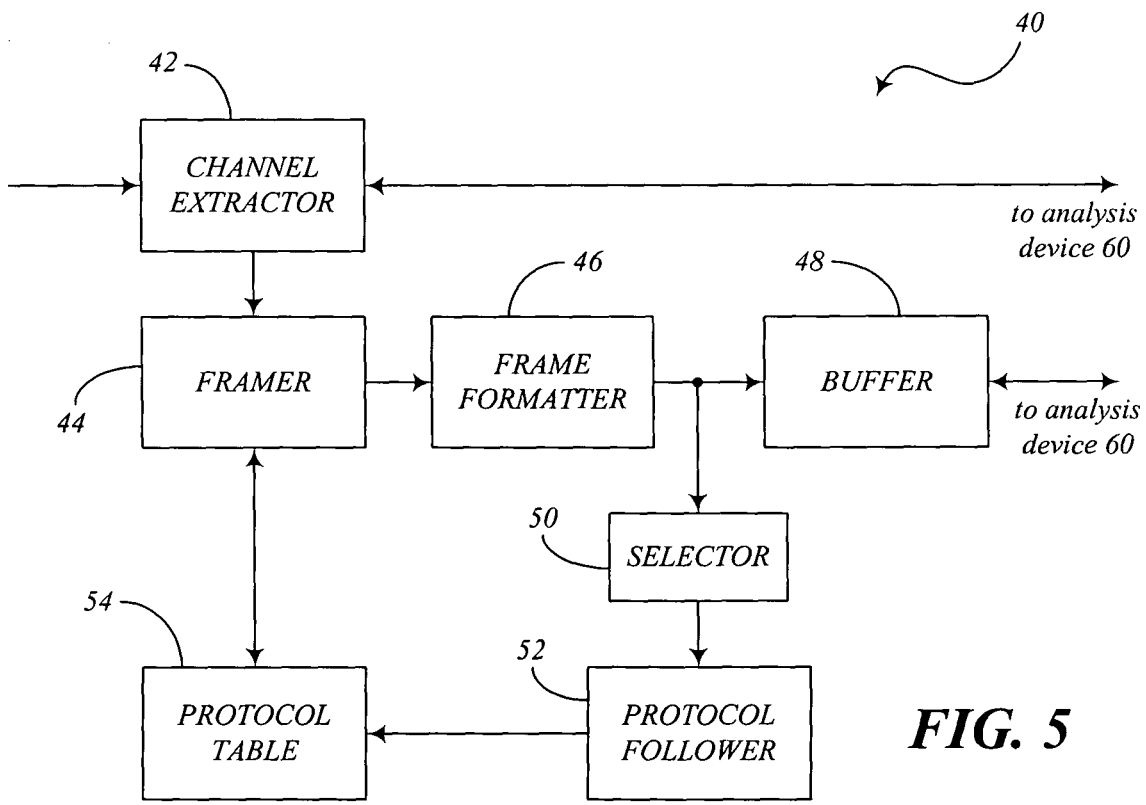
FIG. 5 is a block diagram of an embodiment of the framing module shown in FIG. 3.

FIG. 5 is a block diagram of an embodiment of the framing module 40 shown in FIG. 3. The framing module 40 according to this embodiment includes a channel extractor 42, a framer 44, a frame formatter 46, a buffer 48, a selector 50, a protocol follower 52, and a protocol table 54. In general, the framing module 40 includes the channel extractor 42 in communication with the analysis device 60, a framing device including the framer 44, frame formatter 46, and the buffer 48. In a feedback path, the framing module 40 includes the selector 50, protocol follower 52, and protocol table 54.

Figure 6:
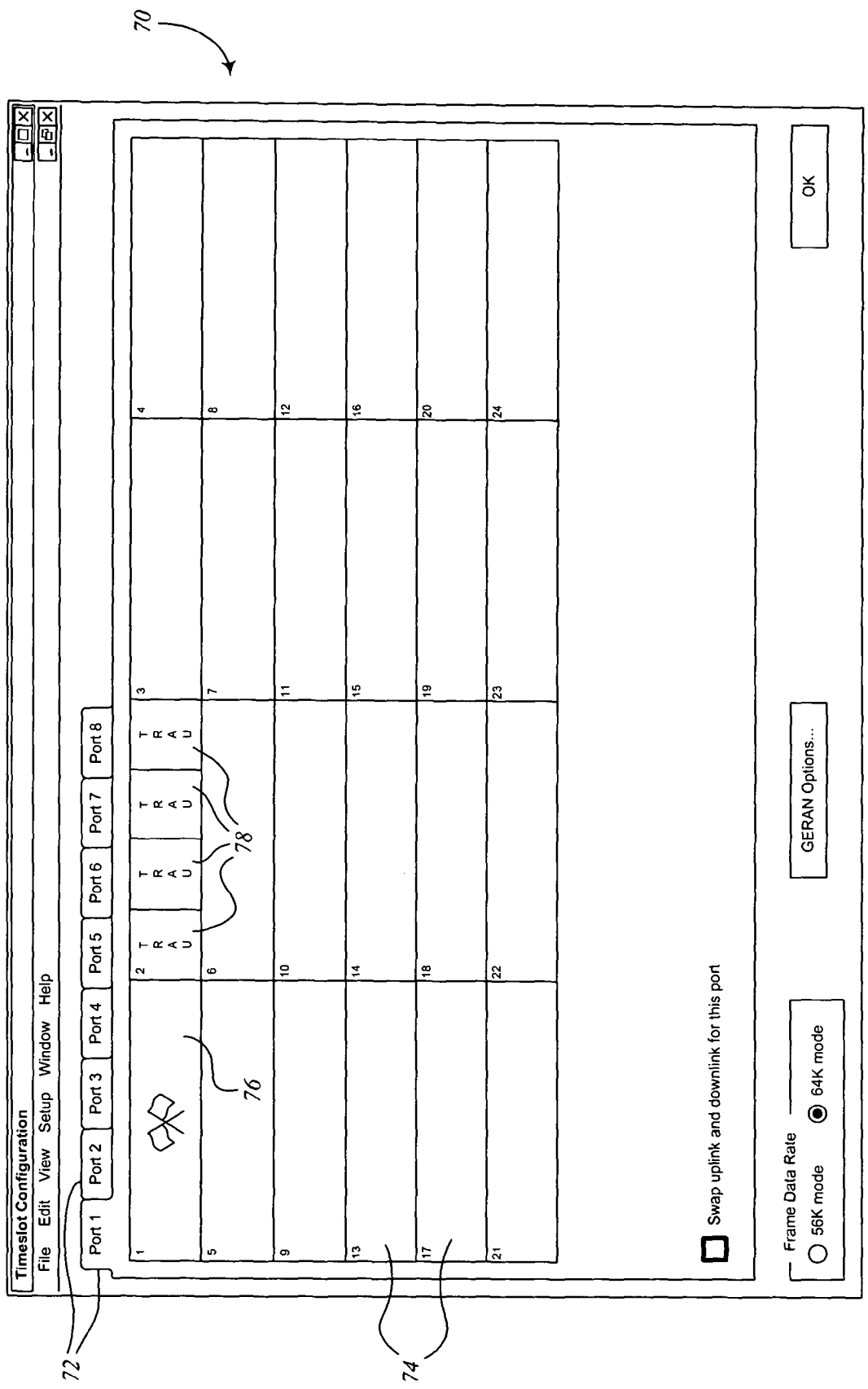
FIG. 6 is a screen view of a graphical user interface for configuring the timeslots of signals in a T1 format.

The channel extractor 42 utilizes a graphical user interface (GUI) allowing a technician, for example, to appropriately set up the channels for analysis. One example of a GUI for configuring channels or timeslots is shown in FIG. 6. The technician or user is able to assign 8 kbps, 16 kbps, and multiple 16 kbps timeslots, including at least one 64 kbps signaling channel. The GUI includes one or more mechanisms for selecting one of the ports and selecting a timeslot in the selected port. Also, a signaling channel can be selected along with its location among the timeslots and other corresponding parameters. The user can also define where the pool of 16 kbps sub-slots are located, the format of these sub-slots, etc. The channel extractor 42 assigns each channel a channel number for identification and also assigns each timeslot a timeslot number for identification. With these identification numbers, the software and hardware are able to identify the channels, timeslots, and sub-slots to perform appropriate processing of the signals.

The framer 44 receives the information concerning the BTSs, timeslots, sub-slots, etc. and checks in the protocol table 54 to see whether or not the protocol of the sub-slots is known and whether the protocol is considered valid. If so, the framer 44 runs a framing algorithm based on the information about the sub-slots using a valid protocol. In addition, one action the framer 44 may take is to remove a "0" inserted in HDLC to distinguish valid data from delimiting flags.

Furthermore, the framer 44 considers timing adjustment information embedded with the frame for frame realignment. The adjustment of timing is usually done to allow frames to be shortened or lengthened for network synchronization purposes. The framer 44 maintains this timing adjustment so that analysis can be performed in a continuous fashion.

The frame formatter 46 pieces together many portions of frames to create a frame for analysis. The frame formatter 46 observes the sub-slots and corresponding algorithm applied by the framer 44 and determines whether the framer 44 has completed its processing of the frame. The frame formatter 46 repeatedly stores portions of frames from a plurality of channels simultaneously in order to create complete frames. In this respect, the buffer 48 stores back-to-back frames in a continuous time order. The buffer 48 may include additional algorithms for managing the stored information and decoding the packing scheme whereby redundant bits may be removed from the frame for clarity. Such bits may be portions of framing patterns.

The selector 50 also receives information that is sent to the buffer 48. The selector 50 recognizes and forwards only the signaling channels to the protocol follower 52 for examination. The signaling channel information extracted from the frame is further analyzed to extract other useful information in the protocol follower 52. The protocol follower 52 looks for activation messages, release messages, and modify messages of the signaling channel to determine what timeslots are active for certain protocols. The channel activation message or modify message indicates which of the 8 kbps, 16 kbps, or multiples of 16 kbps are being used. Oftentimes, the channel is activated based on what appears to be needed. For example, a number of data channels may be allocated at first and then adjusted later if a greater demand for a quicker data transfer exists. This information extracted by the selector 50 is submitted to the protocol follower 52.

Furthermore, the protocol follower 52 observes how the channels are being used, based on the information from the selector. From the signaling channel, the protocol follower 52 analyzes the activation message, modify message, and release message. The protocol follower 52 stores all possible channel, timeslot, and sub-slot allocation information in the protocol table 54 for each new message that is processed. The protocol table 54 stores these acceptable protocols. The framer 44 continues to access the information in the protocol table 54 to see if incoming channels are to be framed.

FIG. 6 is a view of a graphical user interface (GUI) screen 70 according to one embodiment. The GUI 70 in this example allows a user to select how the 24 timeslots of a T1 are to be allocated. In an alternative embodiment, the GUI 70 may be used in accordance with an E1 line in which 31 timeslots, instead of T1's 24 timeslots, are available. This embodiment illustrates the example where eight ports are available. However, it should be understood that fewer or more ports may be processed at one time in the present application. Tabs 72 are illustrated for selection of any one of the eight ports. Each port is used for one T1 line, which includes 24 timeslots.

The GUI 70 illustrates each timeslot 74 by a rectangular box representing a 64 kbps timeslot bandwidth. As illustrated, the first timeslot 74 is a signaling channel 76 including information about how the other channels are allocated. When the user selects this block, such as by right-clicking in the block 76, then various parameters are displayed. Also, adjustments to the parameters of the signaling channel can be made if necessary. In the second block, the allocation of the second timeslot is shown. In this case, the four 16 kbps sub-slots 78 of the total 64 kbps timeslot are shown to be designated for transcoder rate adapter unit (TRAU). The sub-slots 78 may be divided in any suitable manner according to acceptable allotment protocols. If voice signals are further divided into 8 kbps, a distinguishing representation of this sub-slot division condition may also be shown. Any suitable pictures, icons, text, characters, or the like may be used to represent the signaling channel information or the particular allocation or configuration of the other channels, such as frame format, bandwidth size, etc. Also, the user or technician utilizing the GUI 70 shown in FIG. 6 may utilize various devices for selecting available choices. For example, the user may use a computer mouse, keyboard, or other suitable device for selecting bandwidth allocation characteristics.

In operation, a user opens the GUI 70 window representing the transfer format, such as T1 or E1, being used in the mobile communication system. The user may then select one of the ports to be analyzed. With the selected port showing on the GUI 70, the user is able to select one of the timeslots 74 as needed, even the signaling channel 76. The user sets up the channels or timeslots 74 by controlling the designation of each 16 kbps sub-slot 78 and entering the appropriate format for voice or data. When the timeslots are appropriately configured, the framing module 40 operates as mentioned above to frame the information and store the framed information in the buffer 48. By extracting the signaling channels from the information, the protocol follower 52 determines the protocol being used in framing and stores a list of the appropriate protocols in the protocol table 54. From the protocol table 54, the framer 44 is able to know what protocols are available for use in framing the signals. With properly framed information in the buffer 48, the analysis device 60 can access the framed information from the buffer 48 and perform appropriate analysis on the information. The analysis device 60 may include any suitable circuit analyzer or network analyzer device for measuring, testing, or monitoring the communication signals.

Any process descriptions may be represented by modules, segments, or portions of code that include one or more executable instructions for implementing specific logical functions or steps in the process. Alternative implementations are also included within the scope of the embodiments of the present disclosure in which functions may be executed out of order from that discussed. For example, the processes or functions of the above-mentioned elements may include an order that may be substantially concurrent or in reverse, depending on the functionality involved, as would be understood by those reasonably skilled in the art.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

We claim:

1. A distributed network analyzer for analyzing signals in a mobile communication system, the distributed network analyzer comprising:
    a demultiplexer module configured to receive mobile communication signals from one or more sources and to demultiplex the mobile communication signals into multiple timeslots;
    a framing module configured to assemble frames from the multiple timeslots, the framing module comprising:
        a channel extractor configured to perform timeslot assignments and bandwidth allocations for a signaling channel and for multiple voice or data channels, wherein the channel extractor comprises a graphical user interface (GUI) enabling a user to select the timeslot assignments and the bandwidth allocations for the signaling channel and for the multiple voice or data channels;
        a framing path configured to receive the timeslot assignments and the bandwidth allocations for the signaling channel and for the multiple voice or data channels from the channel extractor; to access a list of appropriate framing protocols; and to assemble the multiple timeslots into frames of the signaling channel and of the multiple voice or data channels, according to the timeslot assignments and the bandwidth allocations for the signaling channel and for the multiple voice or data channels, and according to appropriate framing protocols for the signaling channel and for the multiple voice or data channels from the list of appropriate framing protocols; and a protocol feedback path configured to extract signaling information from the assembled frames of the signaling channel; to analyze the signaling information to determine the timeslot assignments, the bandwidth allocations, and the appropriate framing protocols for the multiple voice or data channels; to communicate the timeslot assignments and the bandwidth allocations for the multiple voice or data channels to the channel extractor; and to store the appropriate framing protocols for the multiple voice or data channels in the list of appropriate framing protocols;

wherein the bandwidth allocations for the multiple voice or data channels are of at least two different sizes; and an analysis device configured to analyze the assembled frames of the signaling channel and of the multiple voice or data channels.

2. The distributed network analyzer of claim 1, wherein the demultiplexer module is configured to demultiplex the mobile communication signals into 64 kilobit per second timeslots.

3. The distributed network analyzer of claim 1, wherein the framing path comprises a buffer configured to store the assembled frames of the signaling channel and of the multiple voice or data channels, wherein the buffer is accessible by the analysis device.

4. The distributed network analyzer of claim 1, wherein the demultiplexer module is configured to receive mobile communication signals in synchronous transfer mode (STM-1) or T1/E1 format from optical or electrical transmission lines.

5. The distributed network analyzer of claim 1, further comprising an integrated circuit, wherein the framing module is embodied in the integrated circuit.

6. The distributed network analyzer of claim 5, wherein the integrated circuit is an application specific integrated circuit (ASIC), a programmable gate array (PGA), or a field programmable gate array (FPGA).

7. A framing module, embodied in an integrated circuit, of a mobile communication system, the framing module comprising:

a channel extractor configured to perform timeslot assignments and bandwidth allocations for a signaling channel and for multiple voice or data channels;

a framing path configured to receive the timeslot assignments and the bandwidth allocations for the signaling channel and for the multiple voice or data channels from the channel extractor; to access a list of appropriate framing protocols; and to assemble timeslots into frames of the signaling channel and of the multiple voice or data channels, according to the timeslot assignments and the bandwidth allocations for the signaling channel and for the multiple voice or data channels, and according to appropriate framing protocols for the signaling channel and for the multiple voice or data channels from the list of appropriate framing protocols; and a protocol feedback path configured to extract signaling information from the assembled frames of the signaling channel; to analyze the signaling information to determine the timeslot assignments, the bandwidth allocations, and the appropriate framing protocols for the multiple voice or data channels; to communicate the timeslot assignments and the bandwidth allocations for the multiple voice or data channels to the channel extractor; and to store the appropriate framing protocols for the multiple voice or data channels in the list of appropriate framing protocols;

wherein the bandwidth allocations for the multiple voice or data channels are of at least two different sizes.

8. The framing module of claim 7, wherein the integrated circuit is an application specific integrated circuit (ASIC), a programmable gate array (PGA), or a field programmable gate array (FPGA).

9. A framing module of a mobile communication system, the framing module comprising:

a channel extractor configured to perform timeslot assignments and bandwidth allocations for a signaling channel and for multiple voice or data channels, wherein the channel extractor comprises a graphical user interface (GUI) enabling a user to select the timeslot assignments and the bandwidth allocations for the signaling channel and for the multiple voice or data channels;

a framing path configured to receive the timeslot assignments and the bandwidth allocations for the signaling channel and for the multiple voice or data channels from the channel extractor; to access a list of appropriate framing protocols; and to assemble timeslots into frames of the signaling channel and of the multiple voice or data channels, according to the timeslot assignments and the bandwidth allocations for the signaling channel and for the multiple voice or data channels, and according to appropriate framing protocols for the signaling channel and for the multiple voice or data channels from the list of appropriate framing protocols; and a protocol feedback path configured to extract signaling information from the assembled frames of the signaling channel; to analyze the signaling information to determine the timeslot assignments, the bandwidth allocations, and the appropriate framing protocols for the multiple voice or data channels; to communicate the timeslot assignments and the bandwidth allocations for the multiple voice or data channels to the channel extractor; and to store the appropriate framing protocols for the multiple voice or data channels in the list of appropriate framing protocols;

wherein the bandwidth allocations for the multiple voice or data channels are of at least two different sizes.

10. The framing module of claim 9, wherein the framing path comprises:

a framer configured to receive the timeslot assignments and the bandwidth allocations for the signaling channel and for the multiple voice or data channels from the channel extractor; and to access the list of appropriate framing protocols;

a frame formatter configured to assemble the timeslots into the frames of the signaling channel and of the multiple voice or data channels, according to the timeslot assignments and the bandwidth allocations for the signaling channel and for the multiple voice or data channels, and according to the appropriate framing protocols for the signaling channel and for the multiple voice or data channels from the list of appropriate framing protocols; and a buffer configured to store the assembled frames of the signaling channel and of the multiple voice or data channels.

11. The framing module of claim 9, wherein the feedback path comprises:

a selector configured to extract the signaling information from the assembled frames of the signaling channel;

a protocol follower configured to analyze the signaling information to determine the timeslot assignments, the bandwidth allocations, and the appropriate framing protocols for the multiple voice or data channels; and to communicate the timeslot assignments and the bandwidth allocations for the multiple voice or data channels to the channel extractor, wherein the signaling information includes an activation message, a modify message, or a release message; and a protocol table for storing the timeslot assignments and the bandwidth allocations for the multiple voice or data channels, and for storing the appropriate framing protocols for the multiple voice or data channels in the list of appropriate framing protocols.

12. The framing module of claim 9, wherein the signaling channel defines how the multiple voice or data channels are configured with respect to timeslot assignment and bandwidth allocation.

* * * * *